Nov. 11, 1952 — I. M. WHITE ET AL — 2,617,622
AXIALLY MOVABLE ROTARY VALVE
Filed Feb. 4, 1947 — 3 Sheets-Sheet 1
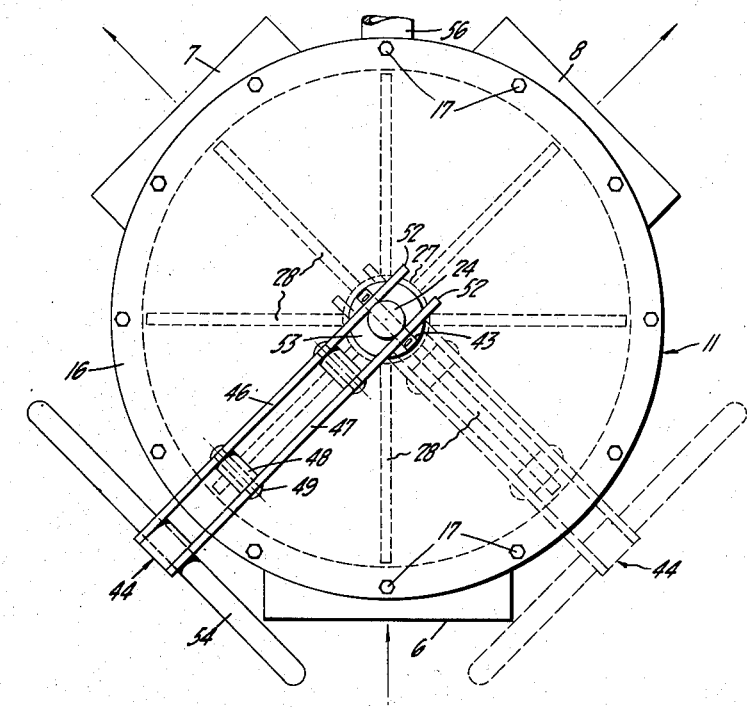
FIG_1_
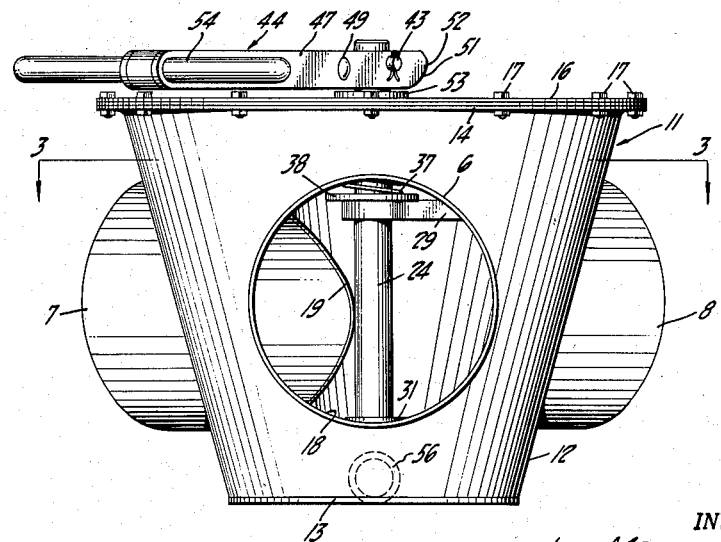
FIG_2_
INVENTORS
Ira Morgan White
David P. Billings
BY Marcus Lothrop Nov. 11, 1952     I. M. WHITE ET AL     2,617,622
AXIALLY MOVABLE ROTARY VALVE
Filed Feb. 4, 1947     3 Sheets-Sheet 2
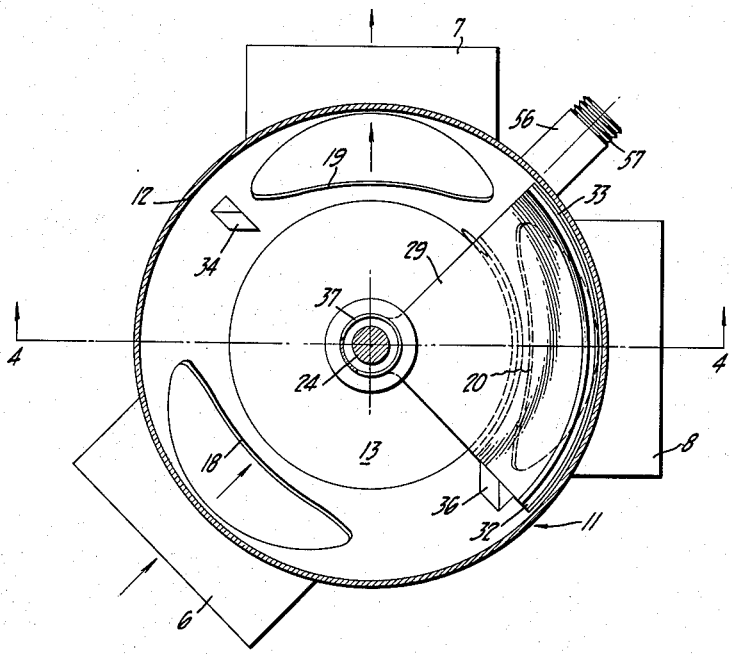
FIG_3_
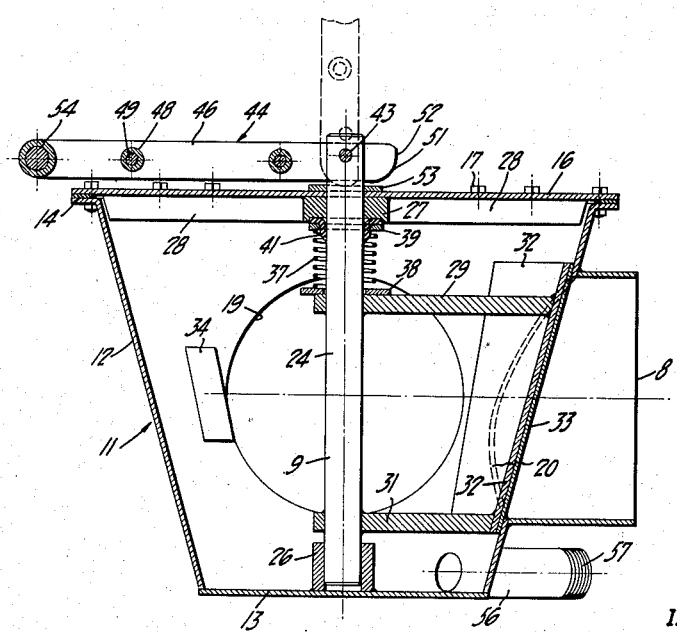
FIG_4_
INVENTORS
Ira Morgan White
David P. Billings
BY Nov. 11, 1952 — I. M. WHITE ET AL — 2,617,622
AXIALLY MOVABLE ROTARY VALVE
Filed Feb. 4, 1947 — 3 Sheets-Sheet 3
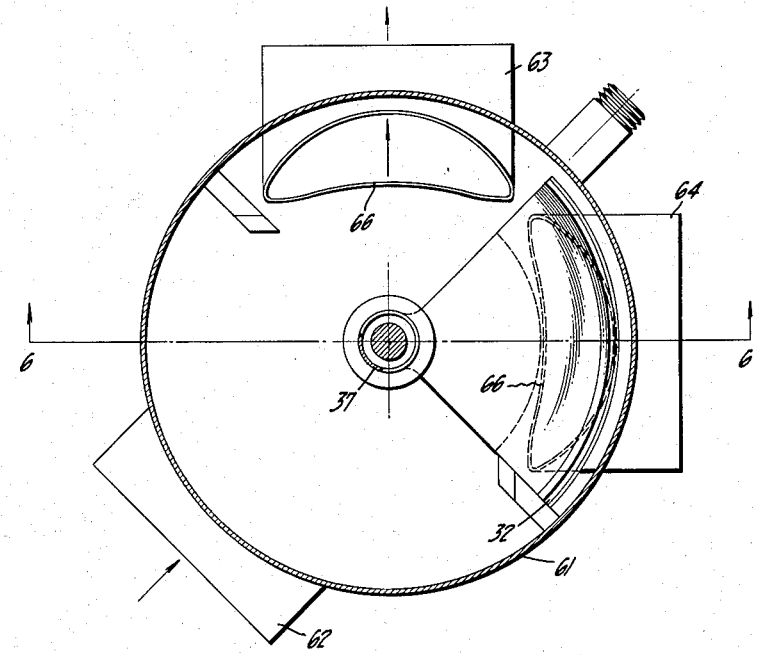
FIG_5_
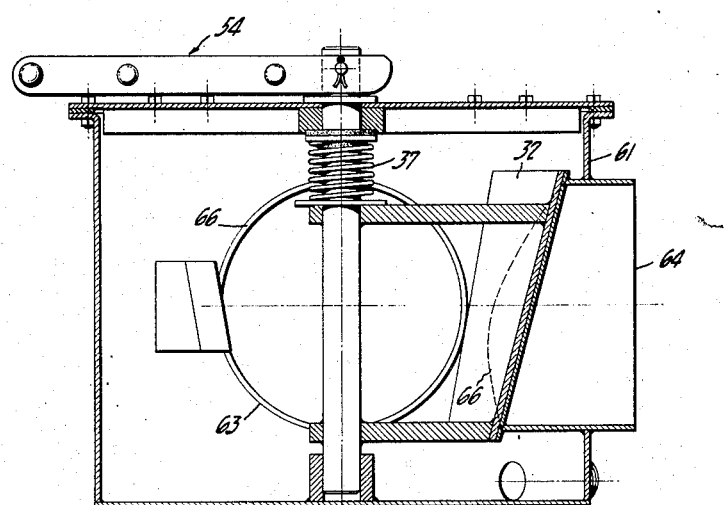
FIG_6_
INVENTORS
Ira Morgan White
David P. Billings
BY Patented Nov. 11, 1952

2,617,622

UNITED STATES PATENT OFFICE 2,617,622

AXIALLY MOVABLE ROTARY VALVE

Ira Morgan White, Walnut Creek, and David P. Billings, San Francisco, Calif., assignors to The Pelton Water Wheel Company, San Francisco, Calif., a corporation of California Application February 4, 1947, Serial No. 726,258

2 Claims. (Cl. 251—97)

Our invention relates to means for controlling and directing fluid flow and is especially concerned with a light, portable and simply constructed structure especially applicable for use in irrigation. In one irrigation technique water from a source is brought to a point of distribution and from that point is led to either of two major selected areas. While the water is being discharged through one pipe system in one of those areas, the portable piping system in the other area is arranged or rearranged for subsequent use. At an appropriate time the properly arranged piping in the second area receives the flow of irrigation water, while the previously irrigated area is temporarily deprived of water to permit the rearrangement and readjustment or relocation of its previously utilized irrigating pipe.

It is an object of our invention to provide an irrigation valve especially useful at a point of water distribution for switching or diverting the flow of water from one area pipeline into another area pipeline.

An additional object of the invention is to provide a valve which has a large fluid capacity yet is light enough to be readily portable so that it can easily be utilized at different locations in an irrigation system.

An additional object of the invention is to provide an irrigation valve which is quite simple and cheap in construction so that the cost thereof will not be exorbitant with respect to the duty performed.

Another object of the invention is to provide an irrigation valve effective fully to seal the pipeline not being utilized against flow of water.

An additional object of the invention is to provide a valve which, although tightly sealed, can readily be moved to another selected position of operation.

An additional object of the invention is to provide an irrigation valve effective for use with irrigation water containing quantities of solids such as silt or sand in suspension.

Another object of the invention is in general to improve irrigation valves.

Further objects together with the foregoing are attained by the embodiments of the invention disclosed in the accompanying drawings in which Figure 1 is a plan of one form of irrigation valve constructed in accordance with our invention.

Figure 2 is a side elevation of the irrigation valve disclosed in Figure 1.

Figure 3 is a cross-section, the plane of which is indicated by the line 3—3 of Figure 2.

Figure 4 is a cross-section, the plane of which is indicated by the line 4—4 of Figure 3.

Figure 5 is a cross-section similar to Figure 3 but showing a modified form of irrigation valve of our invention.

Figure 6 is a cross-section similar to Figure 4 of the modified form of irrigation valve, the plane of section being indicated by the line 6—6 of Figure 5.

In its preferred form the irrigation valve of our invention includes a valve casing having a plurality of pipes intersecting on the casing in radial directions, the pipes terminating on the surface of a cone concentric or coaxial with the casing. A shaft extends into the casing and is provided with arms carrying an arcuate plate terminating on the surface of the cone and adapted to block any selected one of the radial pipes. In most instances the plate has a facing of a suitable valve seating material. A spring normally urges the plate in an axial blocking direction but the urgency of the spring is overcome by a lever located exteriorly of the casing and pivoted to the shaft in such a fashion as to cam against the valve casing when the lever is lifted or rotated about its pivot. A handle extends transversely either side of the lever and serves as a lifting device for the lever as well as a twisting device to turn the shaft. Within the casing are stops for limiting the extent of rotational movement of the plate. Preferably, the casing is provided with a blow-off plug or cock normally closed but effective when open to permit forcible discharge of precipitated matter from the interior of the casing.

While the irrigation valve of our invention is readily capable of embodiment in a large number of different forms all having the same fundamental relationship and mode of operation, it is successfully embodied in the two forms shown herein. In the form shown in Figures 1 to 4 inclusive, the valve is for inclusion in an entrance pipeline 6 leading to exit pipelines 7 and 8 respectively. The pipelines or conduits 6, 7 and 8 are arranged in substantially the same plane and are all radial with respect to a central axis 9 likewise the center of a valve casing 11. The pipelines are arranged for the attachment of supply and distribution pipes in the customary fashion and serve to distribute water from the supply pipe 6 to either of the distribution conduits or pipes 7 and 8.

The valve casing 11 is conical in form or constitutes in effect a truncated cone and is preferably fabricated of a relatively thin sheet of material, such as sheet steel, formed to provide a conical side wall 12 at its bottom closed by a circular bottom plate 13 and at its top provided with an out-turned flange 14 for the reception of a circular disc cover 16, likewise fabricated of relatively thin metal. A peripheral series of fasteners 17 holds the cover onto the valve casing body in a water-tight fashion. The usual pressure contained by the body is of the order of 25 pounds per square inch and because of the relatively strong form of the casing, the material of the walls and of the bottom and cover is relatively thin and light and easy to fabricate, for example by welding. The pipes 6, 7 and 8 intersect the wall 12 of the valve casing and are preferably terminated on the outer face of the casing which is then pierced to provide apertures 18, 19 and 20 to permit fluid flow. As an alternative, the apertures 18, 19 and 20 are made slightly larger, although of the same general contour, in order to receive the ends of the pipes 6, 7 and 8. These then are welded in place with the pipe ends substantially co-terminous with the interior conical surface of the casing 12.

Within the enclosed casing so formed, we provide means for blocking either of the openings 19 or 20, that is to say the pipes 7 or 8, selectively or as desired. To this end there is disposed coaxially within the casing 12 a central shaft 24 at its lower end received in a journal 26 constituted by a sleeve welded to the bottom plate 13 and likewise journaled in a hub 27 mounted by welding on the cover plate 16. A plurality of radially extending reinforcing ribs 28 stiffen the cover 16 sufficiently to locate the hub 27 accurately under all of the forces normally encountered in use.

On the shaft there is provided a pair of arms 29 and 31 respectively constituted by metal straps pierced to slide over the shaft 24 and welded in suitable axially displaced locations. Each of the arms 29 and 31 is approximately a quadrant in plan (as seen in Figure 3) and is of slightly greater angular extent than either of the openings 19 or 20. At their outer ends the quadrant arms 29 and 31 are both joined to a plate 32, arcuate in plan, subtending an angle of approximately 90 degrees. The plate 32 conforms substantially to the surface of the cone defined by the inner face of the casing side 12 or of the ends of the pipes 6, 7 and 8. The plate 32 is designed to serve as a blocking member or seal and to facilitate such use, its outer surface is covered by a layer 33 of an appropriate sealing material, for example rubber or a relatively soft metal, for example bronze.

Due to its close fit with the conical surfaces of the casing or pipes, when the plate 32 is positioned thereover it effectively serves as a barrier to preclude leakage into the associated pipeline. The plate is rotatable from a position overlying one of the pipes into another extreme position overlying the other of the pipes and to serve as an indexing or locating means, as well as a device for preventing excessive motion of the plate, a pair of stops 34 and 36 are appropriately positioned on the interior of the casing wall 12.

In order to assist the blocking or closure or sealing function of the plate 32, and in order to take advantage of the conical contours of the parts, we preferably interpose a biasing means 37 such as a helical spring between the hub 27 and the upper arm 29. Since this is a compression spring, it tends to force the plate more firmly on its seat. The spring is supported or located at its lower end by a washer 38 resting directly upon the upper arm 29, while its upper end bears against a washer 39 in turn abutting a packing or sealing gland 41, for example of rubber or leather, designed to preclude leakage from the interior of the casing along the shaft 24. With this arrangement the valve plate 32 always is urged toward its seat whether or not there is any hydraulic pressure within the casing. Normally there is such pressure to supplement the spring 37, but in its absence the spring 37 alone is sufficient to constitute a good seating force.

In order to provide a simple means for manipulating the valve plate 32, the shaft 24 after it emerges from the casing cover 16, is transversely bored to receive a cross pivot pin 43 on which is pivotally mounted an operating lever generally designated 44. This lever is comprised of a pair of side straps 46 and 47 straddling the shaft 24 and held in appropriate assembled relationship by spacers 48 and through rivets 49.

Because the valve 32 may be difficult to move when under fluid pressure, or after long positioning in one location, we provide means not only for giving it the customary rotation, but also for lifting it from its seat by translating it in an axial direction. Since only a slight amount of axial lifting movement is necessary, we accomplish it readily by extending the straps 46 and 47 beyond the point necessary for their connection on the pivot 43 and provide them with especially formed cam contours 51 and 52, the former of which is capable initially of rubbing or camming against a thrust washer 53 on the lid or cover 16. When the lever 44 is rotated clockwise as seen in Figure 4 or is lifted, the cam surfaces 51 contact the washer 53 and due to the stiffness of the cover are effective to lift the shaft 24. This movement compresses the spring 37 and lifts the plate 32 so that even through the face 33 may be somewhat indented or deformed a sharp, clean break with the interior of the conical surface is made. If the lever 44 is rotated through a full 90 degrees, the cam faces 52 come into abutment with the washer 53 and serve to hold the lifted valve in its raised position.

At its outer terminus the lever is pierced by a rod 54 extending transversely on either side of the straps 46 and 47 to constitute a bilateral handle. In the full line position shown in Figure 4, the handle is useful primarily to raise or lift the lever, but in the dotted line position shown in Figure 4 when the lever is substantially coaxial with the shaft 24, the handle 54 then is approximately diametral. The valve operator by twisting the handle or by rotating it about the general axis of the casing, can exert considerable leverage, if necessary, to rotate the shaft and correspondingly the valve plate 32.

This is the customary operation of the valve. The plate 32 is lifted, is rotated through approximately 90 degrees to overlie the other opening until it is in abutment with the adjacent stop. Then the operator lowers the handle 54 substantially into the full line position as shown in Figure 4 during which time the spring 37 is effective to seat the plate 32 or its surface 33 in the new location with the plate overlying or blocking the other of the pipes.

By the use of this valve installed in the field in an irrigation system, an operator can at the selected time, quite readily dislodge the valve plate from its seat, rotate it into the alternate position and there lower it into a tightly seated position. During protracted operation and especially when the irrigation water is charged with solids or silt, there is some tendency for such material to accumulate in the bottom of the valve casing. Consequently, the casing has a blow-off nipple provided with a threaded end 57 for the reception of a cap or plug or plug cock, (not shown) normally closing the blow-off nipple but available for temporary opening to blow off and discharge the settled contents.

In some instances and particularly for manufacturing reasons, we prefer to have the valve casing not of the exteriorly conical form shown in Figures 1 to 4 inclusive, but rather of an exteriorly cylindrical form. In that instance we utilize the structure shown in Figures 5 and 6. This generally is identical with the previously described form except that the valve casing 61 is a circular cylinder. Into the cylinder in radial arrangement project the three conduits or pipelines, an intake pipeline 62, and two outlet pipelines 63 and 64, respectively. The outlet pipelines do not terminate on the surface of the circular cylindrical casing 61 but rather extend into such casing and themselves terminate in faces 66 which lie upon or are coincident with the surface of a cone coaxial with the casing 61. If the material of the pipes is so thin that the face or seat 66 so formed is unduly narrow, we surround the pipes with rings to afford wider seats.

In either instance, the seats are contacted by the conical plate 32 in precisely the fashion disclosed in Figures 1 to 4 and make an equally tight block or seal of the outlet pipes. In this modification the operation is identical in that the valve plate is lifted or axially displaced from a blocking or sealing position by manipulation of the handle 54 in an upward direction and its subsequent rotation. This rotation turns the plate 32 into a new position overlying the pipe end or seat which it contacts when the handle is again lowered and the spring 37 is permitted again to expand. In its new position the valve plate forms an effective block of the associated pipeline.

In both forms of the invention there is provided an irrigation valve of simple, light, inexpensive construction portable in the field to the point of use, readily incorporated in irrigation lines and readily operated by manipulation of the handle to unblock a previously blocked irrigation line and to block a previously unblocked line. The valve is such that even minor inaccuracies in manufacture or irregularities due to rough handling do not preclude the operation of the structure since the sealing or valve plate is first lifted, then rotated, then dropped in order to effectuate a change in the valve operation. The mechanism is subject to ready assembly and disassembly even in the field and parts subject to wear are readily replaced or repaired. Finally, there is afforded a means of discharging any accumulation such as silt from the collection chamber in the bottom of the valve casing so that it cannot interfere with or cause wear of the moving valve closure.

We claim:

1. An irrigation valve comprising a valve casing having an axis and including a bottom plate and a cover, a plurality of conduits radially intersecting said casing, a shaft extending axially across and projecting from said casing, bearings on said bottom plate and said cover for supporting said shaft for rotation and for axial translation, a quadrantal arm support extending radially from one side of said shaft, a frusto-conically contoured plate on said arm support for blocking any one of said conduits, stops positioned on the interior walls of said casing to register said plate in blocking positions, a lever transversely pivoted on said shaft exteriorly of said casing and movable into a position axially aligned with said shaft, a spring opposing the translation of said shaft against said spring, a cam on said lever engageable against said casing to move said shaft axially as said lever is moved into said aligned position, said cam being contoured to maintain said lever in said aligned position under tension of said spring, and a handle on said lever projecting radially therefrom when said lever is in said aligned position.

2. An irrigation valve comprising a valve casing having a cover with a flat surface thereon, a conduit intersecting said casing, a shaft projecting from said casing through said cover, means on said shaft within said casing for blocking said conduit, a lever having a handle projecting radially therefrom, a pivot connecting said lever to said shaft to turn about a transverse axis substantially intersecting the axis of said shaft between a position substantially perpendicular to said shaft and a position substantially in alignment with said shaft, and a cam on said lever having an arcuate portion adapted to engage the flat surface on said cover for axial translation of said shaft and having a straight portion engageable with said flat surface to maintain said lever substantially coaxial with said shaft and rotatable on said flat surface in position of coaxiality.

IRA MORGAN WHITE.
DAVID P. BILLINGS.

REFERENCES CITED

The following references are of record in the file of this patent:

UNITED STATES PATENTS

| Number | Name | Date |
| --- | --- | --- |
| 156,087 | Higgs | Oct. 20, 1874 |
| 912,890 | Roberts | Feb. 16, 1909 |
| 1,166,571 | Bard | Jan. 4, 1916 |
| 1,678,204 | Srulowitz | July 24, 1928 |
| 2,071,814 | Brisbane | Feb. 23, 1937 |
| 2,209,992 | McGill | Aug. 6, 1940 |

FOREIGN PATENTS

| Number | Country | Date |
| --- | --- | --- |
| 96,037 | Switzerland | of 1922 |
| 400,078 | France | of 1909 |
| 442,860 | France | of 1912 |
| 898,484 | France | of 1945 |